(12) United States Patent
Stroempl et al.

(10) Patent No.: US 8,888,140 B2
(45) Date of Patent: Nov. 18, 2014

(54) HOSE FITTING

(75) Inventors: Peter J. Stroempl, Forth Worth, TX (US); Nagarajan Ramaswamy, Forth Worth, TX (US)

(73) Assignee: Parker-Hannifin Corporation, Cleveland, OH (US)

( * ) Notice: Subject to any disclaimer, the term of this patent is extended or adjusted under 35 U.S.C. 154(b) by 1097 days.

(21) Appl. No.: 12/707,851

(22) Filed: Feb. 18, 2010

(65) Prior Publication Data

US 2010/0207387 A1    Aug. 19, 2010

Related U.S. Application Data

(60) Provisional application No. 61/153,373, filed on Feb. 18, 2009.

(51) Int. Cl.
*F16L 33/22* (2006.01)
*F16L 37/138* (2006.01)

(52) U.S. Cl.
CPC ............ *F16L 33/225* (2013.01); *F16L 37/138* (2013.01)
USPC ........................................... 285/255; 29/508

(58) Field of Classification Search
USPC ........... 285/222.1–222.5, 239, 242, 256, 255; 29/508
See application file for complete search history.

(56) References Cited

U.S. PATENT DOCUMENTS

| | | | |
|---|---|---|---|
| 1,781,222 A | 11/1930 | Fischer | |
| 1,903,499 A | 4/1933 | Bijur | |
| 2,179,200 A * | 11/1939 | Scholtes | 285/250 |
| 2,184,116 A * | 12/1939 | Eastman | 285/256 |
| 2,314,001 A * | 3/1943 | Lusher et al. | 285/256 |
| 2,319,024 A * | 5/1943 | Wehringer | 285/256 |
| 2,333,612 A | 11/1943 | Zimmer | |
| 2,463,293 A * | 3/1949 | Mentel | 285/222.4 |
| 2,485,976 A * | 10/1949 | Main | 285/106 |
| 2,487,554 A * | 11/1949 | Hurst | 285/47 |
| 2,685,458 A * | 8/1954 | Shaw | 285/222.4 |
| 2,704,074 A * | 3/1955 | Butler | 604/272 |
| 3,023,496 A | 3/1962 | Millar | |
| 3,262,721 A * | 7/1966 | Knight | 285/148.14 |
| 4,008,911 A | 2/1977 | Kiyooka et al. | |

(Continued)

FOREIGN PATENT DOCUMENTS

| | | |
|---|---|---|
| DE | 10 2008 039 446 | 1/2010 |
| EP | 1 288 554 | 3/2003 |
| WO | 98/01695 | 1/1998 |
| WO | 2008/141386 | 11/2008 |

OTHER PUBLICATIONS

European Search Report for corresponding European Patent Application No. 10153958.3, dated Jun. 22, 2010.

*Primary Examiner* — Gregory Binda
(74) *Attorney, Agent, or Firm* — Renner, Otto, Boisselle & Sklar, LLP

(57) ABSTRACT

A hose fitting that includes a body having a connection portion configured for connection to an external component, a tubular nipple portion configured for insertion into an end of a hose, and a union portion joining the nipple portion to the connecting portion. The socket also has a crimp portion extending from the union portion of the socket. A swage collar having a tapered inner surface radially inwardly deforms the socket when the swage collar is moved axially over the socket to retain a hose between the socket and the nipple portion of the body.

16 Claims, 2 Drawing Sheets

(56) References Cited

U.S. PATENT DOCUMENTS

| | | |
|---|---|---|
| 4,114,930 A | 9/1978 | Perkins et al. |
| 4,157,843 A * | 6/1979 | Trnka et al. ............... 285/255 X |
| 4,621,842 A | 11/1986 | Kowal et al. |
| 4,685,706 A | 8/1987 | Kowal et al. |
| 4,932,689 A * | 6/1990 | Bradley .................. 285/255 |
| 5,140,738 A * | 8/1992 | Pinkerman, Jr. ............ 29/508 X |
| 5,560,661 A | 10/1996 | Babel et al. |
| 6,367,850 B1 | 4/2002 | Thrift et al. |
| 6,688,653 B1 | 2/2004 | Thrift et al. |
| 6,769,722 B1 | 8/2004 | Krauleidis |
| 8,262,138 B2 * | 9/2012 | Rischen et al. ............... 285/255 |
| 2003/0034647 A1 * | 2/2003 | Hollingsworth ............... 285/105 |
| 2010/0025986 A1 | 2/2010 | Seton-Anderson |

* cited by examiner

HOSE FITTING

RELATED APPLICATIONS

This application claims the benefit of U.S. Provisional Application No. 61/153,373 filed Feb. 18, 2009, which is incorporated herein by reference.

FIELD OF INVENTION

The present invention relates generally to the field of hose fittings, and more particularly to fittings for flexible hoses.

BACKGROUND

Flexible hoses can be connected to fittings in a fluid system by crimping one end of the hose onto the fitting. For example, the fitting may include a threaded end portion for engaging a coupling nut and a ferrule. The ferrule is disposed within the coupling nut and includes a tapered outer surface for engaging a correspondingly tapered inner surface of the nut. As the nut is threaded onto the fitting, the ferrule is pressed against an annular shoulder on the fitting. As the nut is further threaded onto the fitting, the tapered inner surface of the nut compresses the tapered outer surface of the ferrule radially inward such that the ferrule swages into the outer wall of the hose, thereby effecting a permanent connection between the ferrule and the hose. Such fittings also may include a nipple for receiving the end of the hose and for providing the annular surface that engages the ferrule as the coupling nut is threaded onto the fitting.

SUMMARY OF INVENTION

The present invention provides a novel fitting for a flexible hose. The fitting includes a body having a nipple portion, a socket and a swaging collar that is axially movable over the socket to connect the hose to the fitting. In a preferred embodiment, the fitting can be connected to a hose by sliding the swage collar axially relative to the socket with a handheld swaging tool making the fitting convenient to use both in production and in the field.

According to one aspect of the invention, a hose fitting includes a body having a connection portion configured for connection to an external component, a tubular nipple portion configured for insertion into an end of a hose, and a union portion joining the nipple portion to the connecting portion. A socket having a union portion is joined against relative axial movement to the union portion of the body. The socket also has a crimp portion extending from the union portion of the socket, the crimp portion surrounding at least a portion of the tubular nipple portion of the body. A swage collar having a tapered inner surface radially inwardly deforms the socket when the swage collar is moved axially over the socket to retain a hose between the socket and the nipple portion of the body.

According to another aspect of the invention, a hose fitting includes a body having a connection portion extending towards a rear end of the fitting, a nipple portion extending towards a front end of the fitting, and a union portion joining the nipple portion to the connecting portion. The fitting also includes an annular socket having a crimp portion for surrounding a portion of the nipple portion in radially spaced relation to receive an end of a hose. The crimp portion has an inner annular surface that is tapered from front to rear in an uncrimped state of the crimp portion. A swage collar is axially movable over the socket to crimp the hose between the nipple portion of the body and the crimp portion of the socket.

According to a further aspect of the invention, a method of assembling a hose fitting assembly includes connecting an end of a hose to a front nipple portion of a body having a connection portion extending towards a rear end of the fitting and a union portion joining the nipple portion to the connecting portion. The method further includes surrounding at least a portion of the end of the hose with a crimp portion of an annular socket, the socket having an inner annular surface that is tapered from front to rear in an uncrimped state of the crimp portion. The method also includes pressing a swage collar having a tapered inner annular surface over the socket to crimp the hose between the nipple portion of the body and the crimp portion of the socket.

Preferably, the fitting includes an indicator that enables visual inspection of the fitting by providing a visual indication of when the swage collar is fully seated relative to the socket.

The foregoing and other features of the invention are hereinafter described in greater detail with reference to the accompanying drawings.

DETAILED DESCRIPTION

Although applicable to a wide variety of systems, the principles of the present invention have particular application to fluid systems in which flexible hose are used, such as the aerospace, automotive, and plumbing industries.

Figure 1:
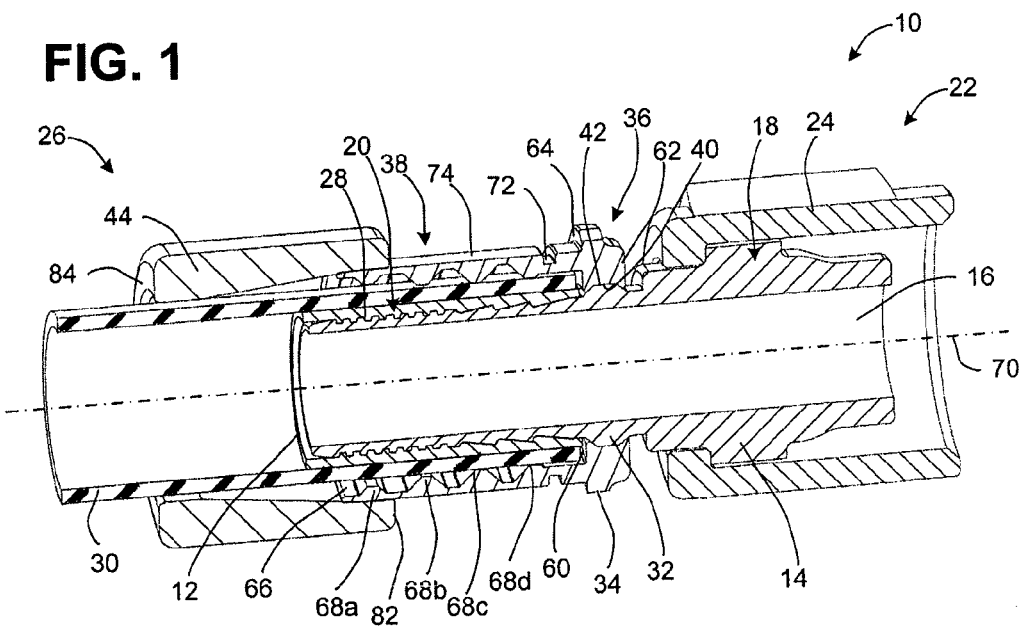
FIG. 1 is a cutaway of an exemplary embodiment of a hose fitting before an end of a flexible hose is crimped to the fitting.
Figure 2:
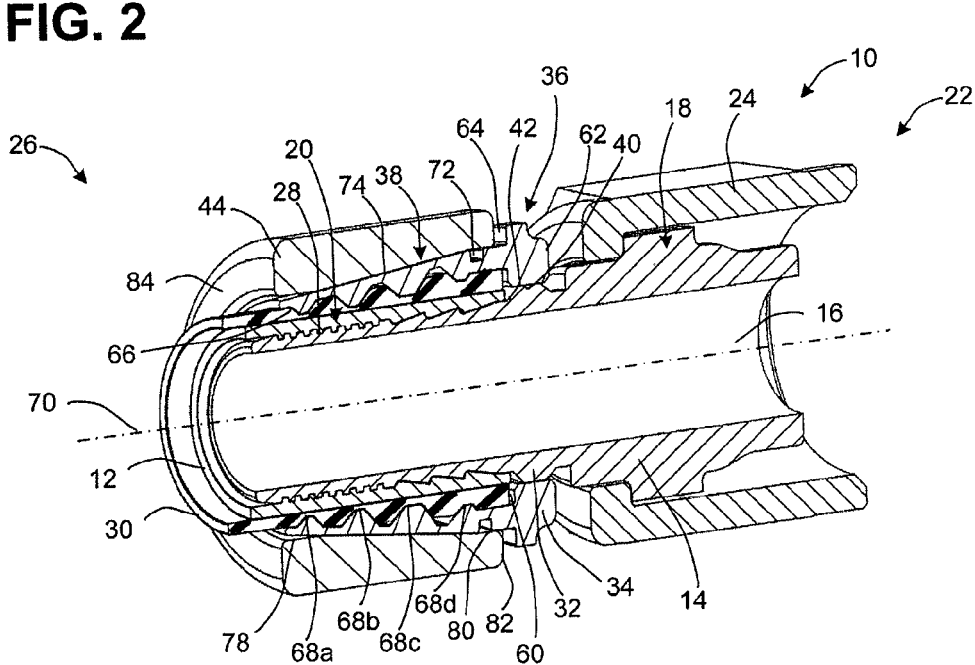
FIG. 2 is a cutaway of an exemplary embodiment of a hose fitting after the end of the flexible hose is crimped to the fitting.

FIGS. 1 and 2 show an exemplary embodiment of a unique hose fitting 10 in accordance with aspects of the invention. In FIG. 1, the hose fitting 10 is shown before an end of a hose 12 is crimped to the fitting 10, and in FIG. 2 the hose fitting 10 is shown after the end of the hose 12 is crimped to the fitting 10.

The fitting 10 has a body 14 including a bore 16. The bore 16 may be an axially extending through bore or may be another shape. As shown in FIGS. 1 and 2, the bore 16 extends from a connection portion 18 of the body 14 to a tubular nipple portion 20 of the body 14.

The connection portion 18 is located at a rear portion 22 (also referred to as a "rear end") of the fitting 10. The connection portion 18 is configured for connection to an external component 24. In the exemplary embodiment of FIGS. 1 and 2 the external component 24 is a B-nut, however, it is noted that the rear end 22 of the fitting 10 can be configured for connection to any conventional component of a fluid system. For example, the rear end 22 can be configured for connection with a manifold by press-fitting, threading, or otherwise connecting the rear end 22 of the body 14 with a receiving bore in the manifold. As another alternative, the rear end 22 can be part of, or be configured for connection to, a union, elbow, tee, cross or other fitting. The rear end 22 also may be connected to a rigid tube, a flexible hose, or another element and/or combination of elements. The rear end 22 also may include components for creating a fluid-tight seal, such as an elastomeric element, such as an O-ring or other sealing element.

The tubular nipple portion 20 of the body 14 is located at a front portion 26 (also referred to as a "front end") of the fitting 10. The nipple portion 20 is configured for insertion into an end of the hose 12. The nipple portion 20 has a plurality of barbs 28 for engaging the inner wall of the hose 12. As is conventional, the nipple portion 20 is connected to the hose 12 by inserting the nipple portion 20 into the end of the hose 12.

The flexible hose 12 may be constructed, for example, from a polymer, such as polytetrafluoroethylene (PTFE). The hose 12 also may include a reinforcement layer 30, as shown in FIGS. 1 and 2. The reinforcement layer 30 may be, for example, a Corrosion Resistant Steel (ORES) such as UNS 30400 or a yarn, such as Kevlar®.

The end of the hose 12 can be prepared prior to crimping with the fitting 10 to reduce braiding of the hose 12 and/or to ensure that the end of the hose 12 is square (e.g., without any flaring of the outer wall of the hose 12 or the reinforcement layer 30). For example, the end of the hose 12 can be induction welded, flash cut, and/or otherwise prepared to produce a square end without any reinforcement layer flare and/or braiding of the hose. After the hose end is prepared, it is connected to the tubular nipple portion 20 of the body 14 by inserting the tubular nipple portion 20 into the end of the hose 12.

The tubular nipple portion 20 and the connection portion 18 of the body 14 are joined to one another by a union portion 32 of the body 14. The union portion 32 can be an axially extending portion of the body 14. In the illustrated embodiment of FIGS. 1 and 2, the body 14 is a nipple that includes the tubular nipple portion 20 at the front portion 26, the connection portion 18 at the rear portion 22, and the union portion 32 connecting the nipple portion 20 to the connection portion 18.

The union portion 32 of the body 14 is joined to a socket 34 having a union portion 36 and a crimp portion 38. The socket 34, which can have an annular shape, can be joined against relative axial movement to the union portion 32 of the body 14, for example, by threads on one or both of the union portions (e.g., on an outer annular surface 40 of the union portion 32 of the body 14 and/or on an inner annular surface 42 of the union portion 36 of the socket 34). The socket 34 and the body 14 can be joined by welding, press fitting, and/or otherwise joining the union portions. The socket 34 and the body 14 can be machined or molded as a unitary structure. Additionally, a seal, such as an O-ring, may be used to seal an interface between the body 14 and the socket 34.

The socket 34 can be joined against relative axial movement of the union portion 32 of the body 14 independent of a swage collar 44. For example, axial movement of the socket 34 relative to the union portion 32 of the body 14 can be limited even when the swage collar 44 is not assembled on the fitting 10 or engaged to the socket 34.

The union portion 36 of the socket 34 and/or the interface between the body 14 and the socket 34 can include an inner annular shoulder 60 for abutting the end of the hose 12 when the fitting 10 is assembled on the hose 12. The space may be the approximate size of the side wall of the hose 12. For example, the space can be the approximate width of the hose 12 and the reinforcement layer 30 such that the hose 12 fits snuggly between the crimp portion 38 of the socket 34 and the nipple portion 20 of the body 14.

The union portion 36 of the socket 34 can include a rear surface 62 that faces in the general direction of the rear end 22 of the fitting 10 (e.g., in the direction of the external component 24). The rear surface 62 may be an annular surface, such as a radially outwardly extending annular shoulder, for example. In the exemplary embodiment of FIGS. 1 and 2, the rear surface faces towards (e.g., in the direction of) the B-nut.

The rear surface 62 can be configured as a positive stop for the external component 24, thereby limiting the extent of axial movement of external component 24 relative to the body 14. For example, as shown in the embodiment of FIGS. 1 and 2, the rear surface 62 can trap the B-nut between the rear surface 62 and a portion of the rear end 22 of the body 14. The rear surface 62 also can limit axial movement of the body 14 relative to an external component, for example, a fixture to which the fitting 10 may be installed.

The rear surface 62 also can provide a surface for engaging to an external tool, for example, a crimping device such as a handheld crimping tool or other mechanism used to complete the fitting 10. For example, in FIGS. 1 and 2, an arm of the crimping device can be inserted into the space between rear surface 62 of the union portion 36 of the socket 34 and the external component 24 to crimp the hose 12 to the fitting 10.

The union portion 36 of the socket 34 also can include a front surface 64 that faces towards (e.g., in the direction of) the front end 26 of the fitting 10. The front surface 64 may be an annular surface, such as a radially outwardly extending shoulder, for example. The front surface 64 can be a positive stop to limit the extent of axial movement of the swage collar 44 as the swage collar 44 is axially moved over the socket 34 to crimp the hose 12 to the fitting 10.

Extending from the union portion 36 of the socket 34 is the crimp portion 38. The crimp portion 38 extends in the general direction of the front end 26 of the fitting 10 such that the crimp portion 38 surrounds at least a portion of the tubular nipple portion 20 of the body 14. The crimp portion 38 surrounds the tubular nipple portion 20 in a radially spaced relation, which provides a space for receiving the end of the hose 12. For example, as shown in FIGS. 1 and 2, the crimp portion 38 of the socket 34 includes an inner surface 66 that faces inwardly in the general direction of the barbs 28 on the nipple portion 20.

Figure 3:
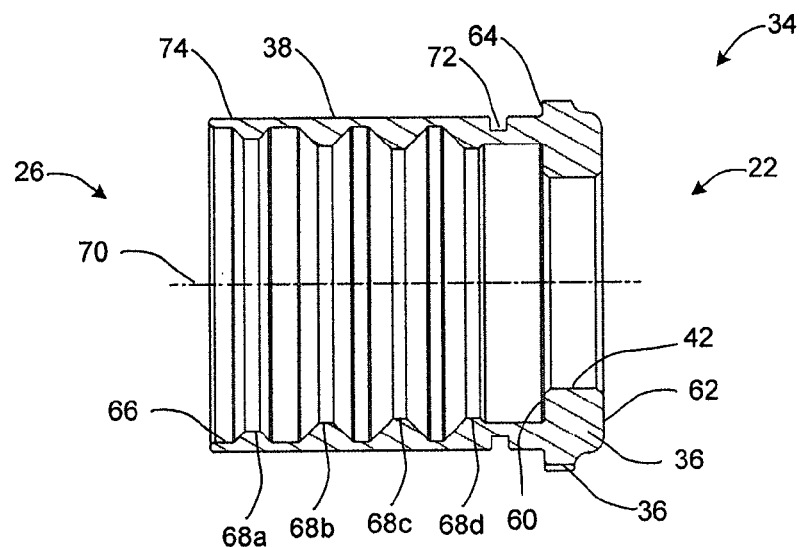
FIG. 3 is a cross-sectional view of an exemplary embodiment of a socket.

The inner surface 66 of the socket 34 can be tapered. For example, FIGS. 1 and 3 show the taper of the inner surface 66 of the crimp portion 38 in an uncrimped state. In the uncrimped state, the inner surface 66 of the crimp portion 38 is tapered from front to rear. The diameter of the inner surface 66 at the front portion 26 of the fitting 10 is therefore larger than the diameter of a rear portion of the inner surface 66. The taper of the inner surface 66 may facilitate insertion of the hose 12 into the fitting 10, for example, by providing a wider opening at the front end of the socket 34 through which the end of the hose 12 is received.

As a result of the taper, the space between the inner surface 66 of the crimp portion 38 and the tubular nipple portion 20 is narrower towards the rear of the crimp portion 38. The smaller space may have a wedging effect when the hose 12 is inserted between the socket 34 and the nipple portion 20. The wedging effect may facilitate the assembly of the fitting 10 to the hose 12, for example, by holding the hose 12 generally in place during the crimping operation.

The inner surface 66 of the socket 34 can include one or more barbs 68a-d for engaging the reinforcement layer 30 and/or outer wall of the hose 12. The barbs 68a-d may be radially inner crests having progressively decreasing spacing from a center axis 70 from the front portion to the rear portion of the socket 34 when the crimp portion 38 is in an uncrimped state. Thus, the inner surface 66 at the front barb 68a has a greater diameter than the inner surface 66 at the next rearward barb 68b, which can be greater in diameter than the next rearward barb 68c, etc. In the exemplary embodiment shown in FIGS. 1-3, the socket 34 has four axially spaced apart barbs 68a-d that generally taper the inner surface 66 of the crimp portion 38 of the socket 34 from front to rear. It should be appreciated that the crimp portion 38 of the socket 34 can have more or less barbs.

The crimp portion 38 of the socket 34, including the barbs 68a-d, is deformed radially inward when the swage collar 44 is moved axially over the socket 34 to crimp the crimp portion 38 of the socket 34 to the hose 12. The deformation of the crimp portion 38 may cause torsional stresses on the union portion 36 of the socket 34. A portion of the socket 34 can be provided with an area of reduced thickness to reduce or to minimize torsional stresses that may act on the union portion 36 of the socket 34. As described in more detail below, the area of reduced thickness also may be an indicator of whether the swage collar 44 is fully seated relative to the socket 34 such that the fitting 10 is fully installed on the hose 12.

The area of reduced thickness may include a groove 72. The groove 72 can enable the crimp portion 38 of the socket 34 to flex relative to the union portion 36 of the socket 34. As shown in the embodiment of FIGS. 1-3, the groove 72 can be disposed in an outer wall of the socket 34 generally between the crimp portion 38 and union portion 36. The groove 72 can be located on the socket 34 forward of the union portion 36, which allows for greater flexion of the crimp portion 38 independently of the union portion 36. The groove 72 therefore can reduce and/or minimize the effects of any stresses acting on the union portion 36 from the radially inward deformation of the crimp portion 38 of the socket 34.

When disposed in the outer wall of the socket 34, the groove 72 can be an indicator that provides a visual indication of when the fitting 10 is fully assembled to the hose 12. For example, the fitting 10 may be fully installed when the groove 72 is covered by the swage collar 44, and an installer can visually inspect the fitting 10 to determine whether the groove 72 is visible or covered by the swage collar 44. When the groove 72 is not covered by the swage collar 44, it can be determined that the fitting 10 is not fully installed, and when the groove 72 is covered by the swage collar 44 it can be determined that the fitting 10 is fully installed.

Although the groove 72 is shown in the outer surface 74 of the socket 34, it will be appreciated that the groove 72 also could be disposed on the inner wall 66 of the socket 34, or at another location that facilitates the bending of the crimp portion 38 of the socket 34 relative to the union portion 36 of the socket 34.

The outer surface 74 of the crimp portion 38 of the socket 34, for example, the portion of the socket 34 forward of the union portion 36 of the socket 34, can have a cylindrical shape. The cylindrical shape can enable the swage collar 44 to be axially moved over the crimp portion 38 of the socket 34 to crimp the end of the hose 12.

The swage collar 44 can be axially moved from the front end 26 of the fitting 10 in the direction of the rear end 22 of the fitting 10 such that the swage collar 44 telescopes over at least a portion of the socket 34. The telescoping movement of the swage collar 44 can crimp the hose 12 between the nipple portion 20 of the body 14 and the crimp portion 38 of the socket 34, for example, by radially inwardly deforming the crimp portion 38 of the socket 34 such that the barbs 68a-d are crimped onto the end of the hose 12. In the crimped position, the swage collar 44 is in contact with the crimp portion 38 of the socket 34 substantially over a full length of the swage collar 44.

The swage collar 44 has a tapered inner surface 76 that radially inwardly deforms the crimp portion 38 of the socket 34 when the swage collar 44 is moved axially over the cylindrical outer surface 74 of the crimp portion 38 to retain the hose 12 between the socket 34 and the nipple portion 20 of the body 14. The inner surface 76 of the swage collar 44 is tapered from a rear end portion of swage collar 44 to a front end portion of the swage collar 44. The diameter of the front end portion of the swage collar 44 is smaller than the diameter of the rear end portion of the swage collar 44.

The inner surface 76 of the swage collar 44 engages the outer surface of the crimp portion 38 of the socket 34 and presses it radially inwards as the swage collar 44 is slid axially over the socket 34. The groove 72 in the socket 34 allows the barbs 68a-d to flex relative to the union portion 36 of the socket 34. The radially inward movement causes a deformation of the barbs 68a-d on the socket 34 forcing them into engagement with the hose 12. As the inner diameter of the collar decreases due to the tapering of the inner surface 66, the barbs 68a-d are driven deeper into the outer wall of the hose 12 and/or reinforcement layer 30 until the barbs 68a-d are embedded into the hose 12 and/or reinforcement layer 30. The radially inward deformation of the crimp portion 38 causes the barbs 68a-d to bite into reinforcement layer 30 and/or outer wall of the hose 12 forming a relatively permanent connection between the hose 12 and the fitting 10.

The socket 34 is held in the crimped position by the swage collar 44. The swage collar 44 can be held in place on the socket 34 in a number of different ways. For example, the angle of the taper of the inner surface 76 of the swage collar 44 can be less than a slip angle so that the collar does not slide off of the socket 34. The swage collar 44 can be self-locking on the socket 34, for example, by frictional retention. In one embodiment, the angle of the taper is less than 15 degrees.

The taper of the swage collar 44 may have a self-holding taper. Self-holding tapers, also referred to as Morse tapers, Brown & Sharpe tapers, and Jacobs tapers, generally have a very low angle (semi-cone angle), typically about 2-4 degrees. Self-holding tapers may be effective up to approximately 7 degrees (semi-cone angle) for steel to steel engagement. In a preferred embodiment, the angle θ of the taper can be about 6 degrees from the center axis 70, for example, for self-holding features and compactness.

Although less preferred, the swage collar 44 and/or the outer surface 74 of the socket 34 can include a thread for holding the components together. The thread may be self-tapping or both components can have threads for mating with one another. The thread also can be a tapered thread. The swage collar 44 also can be held in place by a band and/or other mechanism.

Figure 4:
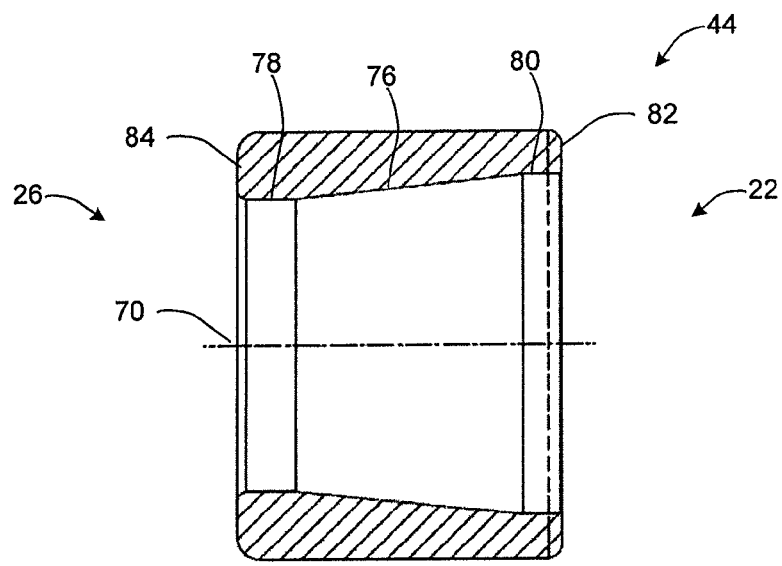
FIG. 4 is a cross-sectional view of an exemplary embodiment of a swage collar.

Although the entire inner surface 76 of the swage collar 44 may be tapered, it also is possible that only a portion of the inner surface 76 of the swage collar 44 is tapered. For example, in the embodiment illustrated in FIG. 4, the inner surface 76 of the swage collar 44 includes a front portion 78 towards the front end 26 of the swage collar 44 that is untapered and a rear portion 80 towards the rear end 22 of the swage collar 44 that is untapered. Although both portions are illustrated as being untapered, it will be appreciated that only one end portion of the inner surface 66 may be untapered, and the untapered portions may not be located at the ends of the inner surface 66.

The rear untapered portion 80 may facilitate the initial engagement of the swage collar 44 and the socket 34, for example, by allowing the swage collar 44 to move axially for a distance over the socket 34 before the tapered portion of the collar begins to deform the crimp portion 38 of the socket 34 radially inwards. The diameter of the rear untapered portion 80 therefore may be about the same or slightly larger than the outer diameter of the outer surface 74 of the crimp portion 38 of the socket 34.

The front untapered portion 78 can provide a space for the socket 34 between the hose 12 and the inner surface 76 of the swage collar 44 and may limit the depth to which the barbs are embedded into the hose 12 and/or reinforcement layer 30. The diameter of the front untapered portion 78 can be greater than the outer diameter of the hose 12 and/or reinforcement layer 30 to allow the front untapered portion 78 to slide over the front end of the crimp portion 38 of the socket 34 after it has been deformed radially inward. Thus, a portion of the crimp portion 38 of the socket 34 may pass through the front portion of the swage collar 44 as the rear portion of the swage collar 44 is moved axially towards the union portion 36 of the socket 34.

The axial movement of the swage collar 44 relative to the socket 34 can be limited such that the swage collar 44 stops short of the connection portion 18 of the body 14. For example, the rear portion of the swage collar 44 can have a rear surface 82 for abutting the positive stop on the socket 34. The front surface 64 of the union portion 36 of the socket 34 can therefore limit the axial movement of the swage collar 44 relative to the socket 34.

The swage collar 44 can be formed in any suitable manner. For example, the swage collar 44 can be a machined part that is not subject to irregularities of non-machined crimp fittings, such as crimp jaw marks, irregular metal flow due to crimp, taper surface, etc. The machined swage collar 44 also can produce a crimp that is more aesthetically pleasing than non-machined crimp fittings because the deformation of the socket 34 is covered by the swage collar 44 and therefore not visible when the fitting is completed.

The machined dimension of the front portion of the swage collar 44 can be very close to the outside diameter of the hose 12 and/or reinforcement material with some room for growth in the diameter of the hose 12 due to the compression of the hose 12 by the socket 34.

The position of the swage collar 44 relative to the socket 34 can be visually inspected by an installer, and the fitting 10 may include an indicator for providing a visual indication of whether the swage collar 44 is fully seated relative to the socket 34. For example, the indicator may be on the socket 34 and hidden from view by the swage collar 44 when the swage collar 44 is fully seated relative to the socket 34.

The indicator may be the groove 72 in the outer wall of the socket 34, for example. The installer can visually inspect the fitting 10 to determine if the swage collar 44 has been moved axially past the groove 72. If the groove 72 is covered (e.g., hidden from view) by the swage collar 44, then it can be determined by the installer that the swage collar 44 is fully seated relative to the socket 34. If the groove 72 is not covered by the swage collar 44, then it may be determined that the swage collar 44 is not fully seated relative to the socket 34 and/or that additional axial movement of the swage collar 44 over the socket 34 is possible. Additionally or alternatively, the socket 34 may include an indicator, such as a mark, that indicates the position at which the swage collar 44 is fully seated relative to the socket 34.

The indicator also can be a space between the rear surface 82 of the swage collar 44 and the front surface 64 of the union portion 36 of the socket 34. For example, if the space is small or if the swage collar 44 and front surface 64 are abutting one another, then it can be determined that the swage collar 44 is fully seated relative to the socket 34. The existence of a space between the swage collar 44 and front surface 64 may indicate that the fitting 10 is not fully installed and/or that additional axial movement of the swage collar 44 over the socket 34 is possible.

The indicator therefore provides for visual indication of whether the fitting 10 is complete. The indicator can eliminate uncertainties as to whether or not the socket 34 is fully installed onto the hose 12 and also may simplify the installation process. Additionally, the installer does not need to unseat or remove the swage collar 44 to visually inspect the engagement between the socket 34 and the hose 12. The visual inspection also allows the fitting 10 to be inspected without using a dial caliper measurement of the swage diameter, the crimp length, or the amount of taper, which can represent a time savings for the installer.

When the hose 12 is crimped to the fitting 10 the outer surface 74 of the crimp portion 38 is pressed radially inward by the tapered inner surface 76 of the swage collar 44. For example, as shown in FIG. 2, in a crimped state the diameter of the outer surface 74 of the crimp portion 38 at the front of the fitting 10 is less than the diameter of the outer surface 74 of a rear portion of the crimp portion 38. The barbs near the front portion (e.g., barbs 68a, 68b) of the fitting 10 therefore are radially inwardly displaced a greater distance than the barbs at a rear portion (e.g., barbs 68c, 68d) of the crimp portion 38 of the socket 34. As mentioned above, the groove 72 in the socket 34 may enable the barbs 68a-d to flex relatively independently of the union portion 36 of the socket 34 to effect the connection with the hose 12.

The axial movement of the swage collar 44 over the socket 34 to crimp the end of the hose 12 can be accomplished by mechanical implement, for example, a hand-operated swaging device, an automated swaging device, and/or another mechanism. The mechanical implement may include a pair of relatively axially movable arms for engaging a front surface 82 of the swage collar 44 and the rear surface 62 of the socket 34. The device can be activated to press one of the arms towards the other to such that the pressing of the swage collar 44 axially over the socket 34 is effected by a handheld crimping mechanism. The axial movement of the swage collar 44 from the front end of the fitting 10 towards the rear end 22 of the fitting 10 causes the radially inward deformation of the socket 34 that crimps the hose 12 to the fitting 10. The swage collar 44 can be pressed over the socket 34 until the indicator, for example, the groove 72, is covered by the swage collar 44, which indicates that the swage collar 44 is fully seated relative to the socket 34. While the swage collar 44 may be rotatable relative to the socket 34, rotational movement of the swage collar 44 is not necessary for crimping the hose 12 to the fitting 10. The swage collar 44 therefore can be axially telescopically pressed over the socket 34 without substantial rotation.

By using a hand-operated swaging device, the connection between the fitting 10 and the hose 12 can be completed within the confines of a fixture. The fitting 10 therefore lends itself to assembly on site, for example, by air framers while routing hose 12 assemblies and hose during assembly or fit up. The hose 12 also may not have to be removed from the fixture for crimping or additional handling. After the crimping operation, the hose and fitting assembly can be moved directly to a proof pressure test station because the crimping operation is carried out in the fixture by a hand-operated swaging device.

After the hose 12 is connected to the hose fitting 10, the connection end 18 can be connected to another component of a fluid system, for example, another connector, a hose, a tube, or another component of the fluid system. The hose fitting 10 can be incorporated with a tube fitting on one end of the fitting 10 to connect to multi-bend tubes, or a conventional braze tube end (BTE) can be machined to mate up with the hose fitting 10.

The hose fitting 10 described herein can be constructed from any suitable material or combination of materials including, for example, metals and/or plastics or other materials.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application. Furthermore, directional modifiers (e.g., front, back, upper, top, lower, bottom, above, below, left-hand, right-hand, etc.) are used only for ease in explanation in connection with the illustrated orientation and do not, unless otherwise indicated, limit the elements to any specific orientation.

The invention claimed is:

1. A hose fitting comprising:
    a body having a connection portion configured for connection to an external component, a tubular nipple portion configured for insertion into an end of a hose, and a union portion joining the nipple portion to the connecting portion;
    a socket having a union portion joined against relative axial movement to the union portion of the body and having a crimp portion extending from the union portion of the socket, the crimp portion surrounding at least a portion of the tubular nipple portion of the body; and
    a swage collar having a tapered inner surface that radially inwardly deforms the socket when the swage collar is moved axially over the socket to retain a hose between the socket and the nipple portion of the body;
    wherein the crimp portion of the socket is joined to the union portion of the socket by an annular reduced thickness wall portion, whereby the transfer of torsional forces acting on the crimp portion of the socket relative to the union portion of the socket is reduced; and
    wherein the socket has an inner surface that is radially inwardly tapered going in a direction of the union portion of the socket in an uncrimped state of the crimp portion.

2. The hose fitting of claim 1, wherein the inner surface of the socket includes one or more barbs for crimping the hose, the barbs being radially inner crests having progressively decreasing radial spacing from a center axis of the socket going in the direction of the union portion of the socket in an uncrimped state of the crimp portion.

3. The hose fitting of claim 1, including an indicator that provides a visual indication of whether the swage collar is fully seated relative to the socket.

4. The hose fitting of claim 1, wherein the reduced thickness wall portion is formed by an annular groove in a wall of the socket.

5. The hose fitting of claim 1, wherein the swage collar is axially telescopically slidable over the crimp portion without rotation.

6. The hose fitting of claim 1 assembled to a hose.

7. The assembly of claim 6, wherein the crimp portion of the socket is held in a crimped position by the swage collar.

8. The assembly of claim 7, wherein the swage collar is in contact with the crimp portion of the socket substantially over a full length of the swage collar.

9. The hose fitting of claim 1, wherein an outer surface of the crimp portion of the annular socket is cylindrical in an uncrimped state of the crimp portion.

10. The hose fitting of claim 9, wherein the inner surface of the socket includes one or more barbs for crimping the hose, the barbs being radially inner crests having progressively decreasing radial spacing from a center axis of the socket from front to rear in an uncrimped state of the crimp portion.

11. The hose fitting of claim 9, including an indicator that provides a visual indication of whether the swage collar is fully seated relative to the annular socket.

12. The hose fitting of claim 9, further including an axially extending bore through the body.

13. A hose fitting assembly comprising the hose fitting of claim 9 and a hose, the hose having an end received between the crimp portion and the nipple portion, and wherein the crimp portion is crimped radially inwardly around the end of the hose by the swage collar telescoped over the crimp portion.

14. A method of assembling the hose fitting of claim 1 to a hose, comprising:
    connecting an end of the hose to the nipple portion of the body;
    surrounding at least a portion of the end of the hose with the crimp portion of the socket; and
    pressing the swage collar over the socket to crimp the hose between the nipple portion of the body and the crimp portion of the socket.

15. The method of claim 14, wherein the pressing of the swage collar includes axially telescopically sliding the swage collar over the socket without substantial rotation.

16. The method of claim 14, wherein the pressing of the swage collar is effected by a handheld crimping mechanism.

* * * * *